United States Patent Office 2,780,632
Patented Feb. 5, 1957

2,780,632

CONTINUOUS LIQUID PHASE PROCESS FOR EFFECTING CONDENSATION OF AN ALDEHYDE AND A CARBOXYLIC COMPOUND CONTAINING AN ACTIVE METHYLENE GROUP

Wilbert J. Humphlett, Rochester, N. Y., assignor to Eastman Kodak Company, Rochester, N. Y., a corporation of New Jersey No Drawing. Application June 9, 1954, Serial No. 435,645

6 Claims. (Cl. 260—307)

This invention relates to an improved process for effecting condensation of an aldehyde and a carboxylic compound containing an active methylene group to form an olefinic carboxylate wherein the olefinic unsaturation is in the $\alpha,\beta$-position with respect to the carbonylic carbon atom. More particularly, the invention is concerned with a process for effecting such condensation reactions in improved yields and in relatively short times by continuous and progressive reaction.

One of the useful chemical reactions which has been extensively studied involves the condensation of an aldehyde with the active methylene group of a carboxylic compound wherein the methylene group is adjacent to the carboxylic group. This type of reaction is illustrated by the following equation:

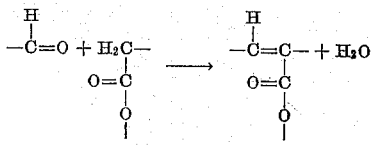

The reaction can be effected between any of the well known aliphatic or aromatic aldehydes with any of the carboxylic compounds, such as free acids, esters, or anhydrides which contain the requisite structure as set out in the above equation. Reactions of this kind between an aromatic aldehyde and a dicarboxylic ester have become known as Knoevenagel reactions. In general, the reactions have been typified as aldol-type condensations, and the reaction proceeds with the elimination of water whereby an olefinic bond is formed between the carbon of the active methylene group and the carbonyl carbon of the aldehyde.

Heretofore, condensation reactions of this type have usually been effected by means of a batch reaction. These batch reactions ordinarily consist of two types. In the first type of reaction, the mixture of aldehyde and carboxylic compound was refluxed in a suitable solvent for many hours to produce the olefinic carboxylate. The yields in this type of batch reaction were usually quite low since the reaction ordinarily proceeds to equilibrium. An attempt was made to increase the yields by including an azeotropic solvent, such as benzene, in the reaction mixture and azeotropically distilling the resulting solvent-water mixture from the reaction during the course of the reaction. By this means, the yield was greatly improved, but it was necessary to carry out the reaction for prolonged periods of time, as for example, for from 18 to 48 hours. Batch reactions of this kind required the use of large-scale equipment, and the product was not obtained until the reaction had been carried out for long periods of time. Such batch reactions on a large scale involved heating and cooling large volumes of reaction mixture, which further prolonged the reaction period. The product which was obtained from the batch reaction usually had to be subjected to extensive purification in order to recover a usable product. The long reaction times permitted unwanted color formation due to decomposition and also promoted the formation of unwanted by-products which had to be removed during the subsequent purification. Thus, although the condensation reactions of this type have been extensively studied from the standpoint of the reaction itself, development of suitable commercial processes for effecting the reaction has lagged far behind.

It is accordingly an object of this invention to provide an improved process for effecting condensation between an aldehyde and a carboxylic compound containing an active methylene group to form an olefinic carboxylate with relatively short reaction periods, high yields of the desired product, and without the necessity for heating and cooling large volumes of reaction mixture at the beginning and end of the reaction.

Another object of the invention is to provide a new process for continuously and progressively producing olefinic carboxylates of high quality without the disadvantages inherent in batch operations.

Another object of the invention is to facilitate the carrying out of large-scale condensations between an aldehyde and a carboxylic compound containing an active methylene group whereby olefinic carboxylates are produced more economically and in greater quantities than in accordance with previous practice.

Other objects will be apparent from the description and claims which follow.

These and other objects are attained by means of this invention, wherein the condensation reactions typified by the equation

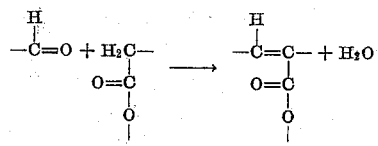

are continuously and progressively carried out by progressively and simultaneously introducing the aldehyde and the carboxylic compound containing an active methylene group into a reaction zone maintained at a temperature above the distilling temperature of the water which is eliminated during the condensation, but below the distilling temperature of the aldehyde, carboxylic compound, and olefinic carboxylate product, continuously flowing the resulting reaction mixture through the reaction zone in the form of a thin film and away from the point of introduction of the reactants into the reaction zone, continuously distilling water out of the reaction mixture as the water is formed in the condensation and while the reaction mixture is flowing in thin film form through the reaction zone, and progressively withdrawing the olefinic carboxylate product from the bottom of the reaction zone. By means of the process embodying this invention, the desired olefinic carboxylate is formed in high yield and of excellent quality in a relatively short reaction time, without the necessity of heating large volumes of reactants at any particular time, and without requiring the use of extensive reaction equipment which is capable of holding large volumes of reaction mixture. Since the crude product which is obtained is already in highly concentrated and almost pure form, the necessity for processing large volumes of reaction mixture is obviated, and in many cases, the crude reaction product is of sufficient purity for use without further processing. One of the primary advantages of the invention resides in the fact that comparable quantities of reactants can be processed in accordance with this invention in periods of time which are as low as 2% of the time required for a comparable batch reaction. Thus, for example, by the process of this invention it is possible to effect the condensation in less than an hour's time which ordinarily would take from 18 to 48 hours in batch operations. Furthermore, in the processes embodying this invention, it is not necessary to employ an azeotropic solvent to effectively remove the water formed during the condensation, and the question of solvent recovery necessary in economical commercial operations is therefore completely eliminated.

The condensation reactions between aldehydes and carboxylic compounds containing an active methylene group are well known in the art, and it will be understood that the processes of this invention are applicable for carrying out any of such condensation reactions. The present invention is not concerned with a new type of chemical reaction, but rather is concerned with an improved process for effecting the well known condensations on a commercial scale. Consequently, it is not intended that the present invention shall be limited to any particular aldehyde or carboxylic compounds containing an active methylene group. Thus, the aldehydes can include both aliphatic and aromatic aldehydes which contain only a single carbonyl group effective to react with the active methylene group of the carboxylic compound. Similarly, the carboxylic compound which is employed as a reactant can be any of the carboxylic acids, esters, or anhydrides having an active methylene group joined directly to the carboxylic carbon atom. The carboxylic compounds can be monocarboxylic, dicarboxylic, or polycarboxylic as desired. The presence of substituent groups in the aldehyde or the carboxylic compound is immaterial, provided such substituent groups do not interfere with the course of the reaction by being reactive with either the carboyl group of the aldehyde or the active methylene group of the carboxylic compound. Thus the condensations which are effected in accordance with this invention can be typified by the equation

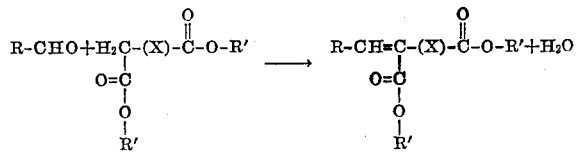

in which R is desirably a hydrocarbon residue which can be an alkyl group, an aryl group, an aralkyl group, or any of these groups containing unreactive substituents. R' can be either hydrogen or a hydrocarbon radical such as an alkyl or aryl group. Alternatively, in the case of dicarboxylic compounds, the anhydride can be employed with equally good results. The group X in the carboxylic compound is included to indicate that the group can be a hydrocarbon residue or any other type of substituent group which contains no radical which will condense or react with the aldehyde. As in all of these condensation reactions, water is eliminated during the condensation whereby an olefinic bond is produced between the carbon atom of the active methylene group and the carbonyl carbon atom of the aldehyde. Although dicarboxylic compounds as shown in this equation are preferably employed, the reaction is equally applicable to compounds containing a single carboxylic group as will be illustrated hereinafter.

A preferred embodiment of the invention involves the condensation of an aromatic aldehyde with an alkyl diester of a dicarboxylic acid in which the alkyl group preferably contains from 1 to 10 carbon atoms. Such condensations are typified by the condensation between benzaldehyde and diethylmalonate to form diethylbenzalmalonate in accordance with the following equation:

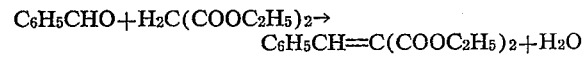

It will be understood that the reaction proceeds in similar fashion between other dicarboxylic compounds and other esters with this or similar aldehydes.

As has been indicated, the invention is applicable for producing a large variety of compounds including compounds which contain but a single carboxylic group. Thus, for example, azlactones can be readily prepared by condensing an aldehyde with hippuric acid, preferably in the presence of an anhydride such as acetic anhydride, to form an azlactone. The preparation of a benzaloxazolone is illustrated by the following equation:

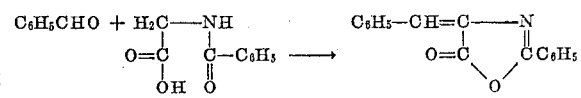

Compounds of this type are important for use in the preparation of amino acids.

The diverse character of the materials which can be processed in accordance with this invention is further illustrated by the condensation of aliphatic aldehydes with carboxylic compounds. As has been indicated, the reaction proceeds readily with anhydrides as well as with esters or free acids. A typical example of the condensation of an aliphatic aldehyde with an anhydride is illustrated by the following equation:

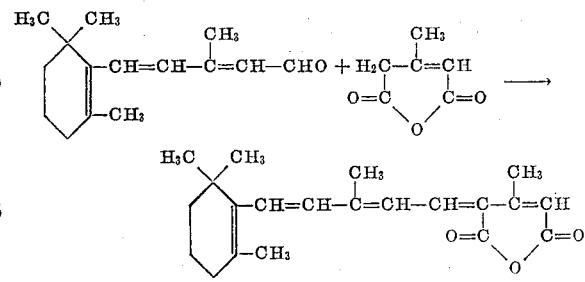

This reaction proceeds readily with either the anhydride or the corresponding ester. The reaction finds utility in the synthesis of compounds of the vitamin A series.

The condensation reactions which are employed in practicing this invention are usually catalyzed with a basic condensation catalyst which facilitates the condensation. In some cases, particularly when an anhydride is employed, it is not necessary to include a basic condensation catalyst. When a catalyst is employed, however, it can be readily introduced with the reactants into the top of the reaction zone, and the catalytic action is equally effective in the thin film reactions of this invention. In practicing the invention, the water which is eliminated during the course of the condensation is continuously distilled from the flowing film of reaction mixture as such water is formed. I have found that this can be readily accomplished in the thin film reactions of the invention without the use of an azeotropic solvent. By the continuous removal of water, the formation of an equilibrium mixture is largely obviated, and the reaction readily proceeds essentially to completion. The process of the invention can be carried out in any suitable apparatus but is preferably carried out by passing the reaction mixture downwardly through a reaction zone defined within a packed column of the type well known in the art. By this means, the reaction mixture is readily broken up into thin film form, and the water continuously distilled out of the reaction mixture as it is formed. The water which is eliminated in the condensation is preferably distilled out of the reaction zone countercurrent to the flowing liquid film whereby the reaction equilibrium is shifted further as the reaction mixture proceeds through the reaction zone. I have found that the distillation of water vapors up through the reaction zone does not adversely affect the course of the reaction since the water concentration is highest at the point of introduction of the reaction mixture into the reaction zone.

When a packed column is employed in accordance with the preferred embodiment, the column can be of any desired size depending upon the rate of product formation desired. Ordinarily, the column is of the usual kind containing packing material such as glass helices, Berl saddles, or similar well known packing materials. The reactants can be introduced into the reaction zone either separately or in a premixture. When one of the reactants is a solid, it is usually desirable to dissolve such solid reactant in an excess of a liquid reactant before introduction into the reaction zone. The use of a solid reactant of this kind does not unduly complicate the process since the product which is formed therefrom can ordinarily be readily crystallized from the excess liquid reactant by merely cooling the product which is withdrawn from the bottom of the reaction zone. In the process of this invention, the olefinic carboxylate is progressively withdrawn from the bottom of the reaction zone whereby the equilibrium which is ordinarily set up in batch reactions is further avoided. When a packed column is employed, the reactants can be introduced at the top of the column at any desired rate up to the point at which the column would become flooded. An indication of the utility of the present invention in commercial production is furnished by the fact that with packed columns of a length of 5 feet and a diameter of 4 inches, product is obtained at rates as high as 10 kg. per hour. Since a batch reaction ordinarily requires at least 18 hours, it can be seen that a column of this kind will produce 180 kg. of product in the time required for a batch reaction of comparable size. Furthermore, although a reaction solvent can be employed, such solvents are not necessary and do not increase the effectiveness of the process whereby all question of solvent recovery is completely overcome. By a suitable correlation of the feed rate of reactants, length of reaction zone, and product withdrawal rate, substantially equimolar proportions of the reactants can be introduced at the top of the reaction zone and product of high concentration representing very high conversions can be progressively withdrawn from the bottom of the reaction zone. In carrying out the reaction, a temperature is maintained so that there is a continuous distillation of water from the reaction zone during the course of the reaction. The temperature employed must, of course, be above the distilling temperature of the water under the reaction conditions and below the distilling temperature of the reactants and the product.

The invention is illustrated by the following examples of preferred embodiments thereof, although it will be understood that the examples are included merely for purposes of illustration and are not intended to limit the scope of the invention unless otherwise specifically indicated.

EXAMPLE 1

A typical reaction which is facilitated by the process of this invention is the condensation of benzaldehyde with a diethylmalonate ester in the presence of a basic catalyst to form diethylbenzalmalonate. In a typical process, benzaldehyde was condensed with diethylmalonate in accordance with this invention by passing a mixture of these two reactants together with a catalytic amount of piperidinium benzoate through a packed column maintained at a temperature high enough to cause a slow distillation of water from the top of the column. Typical data obtained by the "continuous" reaction process of this invention compared with comparable batch reactions is set out in Table 1. The diethylbenzalmalonate which was obtained had physical properties which agreed with these recorded in the literature.

*Table 1*

| Type of Reaction | Solvent | Moles Ester | Moles Aldehyde | Time | Yield, Percent |
|---|---|---|---|---|---|
| Batch—simple reflux | $C_6H_6$, EtOH | 0.63 | 0.67 | 16 hrs | 25 |
| Batch—azeotropic distillation | $C_6H_6$, EtOH | 0.63 | 0.67 | 48 hrs | 86 |
| Do | $C_6H_6$, EtOH | 0.63 | 0.67 | 48 hrs | 80 |
| Do | $C_6H_6$ | 0.63 | 0.67 | 18 hrs | 89.3 |
| Do | $C_6H_6$ | 0.63 | 0.67 | 18 hrs | 90.8 |
| Continuous | $C_7H_8$ | 0.315 | 0.315 | 90 min | 82.1 |
| Do | None | 0.70 | 0.77 | 30 min | 81.3 |
| Do | None | 0.70 | 0.735 | 30 min | 81 |
| Do | None | 0.692 | 0.692 | 30 min | 82 |

As can be seen from the data set out in the table, the condensation reactions of the type carried out in accordance with this invention are equilibrium reactions which cannot be successfully effected in any commercial yield using simple reflux batch reactions. Consequently, in batch reactions, it has been necessary heretofore to resort to azeotropic distillation of the water eliminated during the condensation in order to achieve satisfactory results. Even with the use of azeotropic distillation, however, the reaction itself varied from 18 to 48 hours. Because of this unduly prolonged reaction time, it would thus be necessary to use large capacity equipment in commercial operations of a batch mixture. Furthermore, it is necessary to provide some means for recovering the azeotropic solvent in order to carry out the reaction in economical fashion.

In contrast to this, the process embodying this invention (designated continuous in the table) can be carried out with progressive formation of the desired product in high yields with reaction times of a relatively few minutes. As can be seen from the table, an amount of reactant which required from 18 to 48 hours in the batch reaction could be processed in a column in a total time of from 30 to 90 minutes. In this case, the column employed was 23 inches long and 1 inch in diameter and contained a packing of ⅛ inch glass helices. As shown by the data in the table, a suitable reaction solvent can be used in carrying out the process of the invention, but such solvent is not necessary and usually not desirable since it requires a separation of solvent from the product as well as longer processing times.

It is therefore obvious that the process of this invention provides a greatly improved means for effecting aldol-type condensations on a commercial scale. The apparatus necessary for carrying out the process is extremely simple and does not require any large amount of floor space. Since the reaction mixture is progressively introduced, only relatively small amounts of reactants are heated at any one time whereby the heating means can be a simple low capacity heater. Similar results are obtained with any other condensations involving an aldehyde and a carboxylic compound containing an active methylene group. Another typical reaction is illustrated in the following example.

EXAMPLE 2

Equimolar quantities of benzaldehyde and hippuric acid together with catalytic amounts of acetic anhydride and sodium acetate were progressively passed through a heated packed column with the continuous distillation of water from the column. The water actually combines with the anhydride and is distilled as acetic acid from the column. The product, 4-benzal-2-phenyloxazolone was progressively collected at the bottom of the column and washed with acetic acid to produce a beautiful crystalline compound. The comparative data for the reaction with equal amounts of reactants in a continuous process in accordance with this invention and a conventional batch process are set out in Table 2.

*Table 2*

|  | Time, min. | Crude Yield, percent | Melting Point, Crude | Melting Point, Recrystallized |
|---|---|---|---|---|
| Continuous | 15 | 73 | 166.5–167.5° C. | Unchanged. |
| Batch | 135 | 62–64 | 166–167° C. (Corr.) | 167–168° C. |

As can be seen from Table 2, a 73% yield of crude product was obtained in a total elapsed time of 15 minutes as compared to 2 hours and 15 minutes for a similar batch reaction. The crude product which was obtained by means of this invention was essentially pure and showed no change in melting point upon being recrystallized. The yield was 10% higher for the process of this invention than the corresponding batch process.

The invention thus provides a simple but highly effective process for effecting condensation reactions between aldehydes and carboxylic compounds containing an active methylene group adjacent to the carboxyl group in continuous fashion with high yields of highly concentrated product. Reaction times are greatly reduced, and the amount of product which can be formed in a given period of time is greatly increased. The heating and cooling of large volumes of reactants is obviated, and the necessity for the use of an azeotropic solvent is eliminated. The invention thus provides a number of important advantages over the batch processes which have been used for many years in this type of reaction. Because of its simplicity, a packed column is preferably employed for effecting the process, although any other suitable apparatus whereby the reaction can be effected in a thin flowing film with continuous distillation of water from the reaction mixture can be used.

The invention has been described in considerable detail with particular reference to certain preferred embodiments thereof, but it will be understood that the nature and proportion of the reactants as defined can be varied with similarly improved results, and that other variations and modifications can be effected within the spirit and scope of the invention as described hereinabove and as defined in the appended claims.

I claim:

1. In the process of preparing an olefinic carboxylate by condensing benzaldehyde with a carboxylic compound which is liquid below 100° C., contains an active methylene group adjacent to a carbonylic carbon atom, contains no group reactive with said benzaldehyde other than said active methylene group and is selected from the group of such carboxylic compounds consisting of the free carboxylic acids, their esters and their anhydrides with the elimination of water during the condensation, the improvement which comprises progressively and simultaneously introducing said aldehyde and said carboxylic compound into a packed column maintained at a temperature above the distilling temperature of water eliminated during the condensation but below the distilling temperature of said aldehyde, carboxylic compound and olefinic carboxylate, continuously flowing the resulting mixture of reactants in liquid form downwardly through the packed column whereby said mixture is caused to flow in thin film form, continuously distilling water formed in the condensation upwardly through the column countercurrent to the downflowing liquid reaction mixture, and progressively withdrawing said olefinic carboxylate from the bottom of the column.

2. The process for progressively preparing an unsaturated ester having an olefinic bond in the $\alpha,\beta$-position relative to the carboxylic group which comprises progressively and simultaneously introducing benzaldehyde and an alkyl ester of a saturated aliphatic carboxylic acid having a reactive methylene group adjacent to the carbonylic carbon atom into a packed column maintained at a temperature above the distilling temperature of water and above the solidification temperature of said aldehyde and said esters but below the distilling temperature of said aldehyde and said esters, continuously flowing the resulting mixture of reactants in liquid form downwardly through said packed column whereby said mixture is caused to flow in the form of a thin film, and thereby progressively condensing said reactants to form said unsaturated ester with elimination of water, continuously distilling said water as it is formed out of said column countercurrent to the downflowing mixture of reactants, and progressively withdrawing said unsaturated ester from the bottom of said column.

3. The process for progressively preparing dialkyl benzalmalonate which comprises progressively and simultaneously introducing benzaldehyde, dialkylmalonate and a basic condensation catalyst into a reaction zone defined within a packed column maintained at a temperature above the distilling temperature of water but below the distilling temperature of said benzaldehyde, dialkylmalonate and dialkyl benzalmalonate, continuously flowing the resulting mixture of reactants downwardly in the form of a thin liquid film whereby dialkylbenzalmalonate is progressively formed with elimination of water while said mixture is in flowing thin film form, continuously distilling said water out of said reaction zone countercurrent to the downflowing mixture, and progressively withdrawing dialkylbenzalmalonate from the lower end of said reaction zone.

4. The process for progressively preparing diethyl benzalmalonate which comprises progressively and simultaneously introducing benzaldehyde, diethylmalonate and a basic condensation catalyst into the top of a reaction zone defined within a packed column maintained at a temperature above the distilling temperature of water but below the distilling temperature of said benzaldehyde, diethylmalonate and diethylbenzalmalonate, continuously flowing the resulting reaction mixture in liquid thin film form downwardly through said reaction zone and thereby forming diethylbenzalmalonate with elimination of water, continuously distilling said water out of said reaction zone countercurrent to said downflowing reaction mixture, and progressively withdrawing diethyl benzalmalonate from the lower end of said reaction zone.

5. The process for progressively preparing an azlactone which comprises progressively introducing an aromatic aldehyde, hippuric acid, acetic anhydride and a basic condensation catalyst into the top of a reaction zone defined within a packed column maintained at a temperature above the distilling temperature of water but below the distilling temperature of the reactants and the azlactone, continuously flowing the resulting mixture of reactants in liquid form downwardly through the heated reaction zone in thin film form and thereby progressively forming azlactone with concomitant elimination of water, continuously distilling said water from said mixture and from said reaction zone countercurrent to the downflowing mixture of reactants, and continuously withdrawing azlactone from the lower end of said reaction zone.

6. The method which comprises progressively and simultaneously introducing benzaldehyde, hippuric acid, acetic anhydride and a basic condensation catalyst into the top of a reaction zone defined within a packed column maintained at a temperature above the distilling temperature of water but below the distilling temperature of the reactants and product, continuously flowing the resulting mixture of reactants in liquid form downwardly through said reaction zone in thin film form and thereby progressively forming 4-benzal-2-phenyloxazolone with elimination of water, continuously distilling said water from said reaction zone countercurrent to said downflowing film of reaction mixture, and progressively withdrawing 4-benzal-2-phenyloxazolone from the lower end of said reaction zone.

References Cited in the file of this patent

UNITED STATES PATENTS

| | | |
|---|---|---|
| 2,212,506 | Bachmann et al. | Aug. 27, 1940 |
| 2,293,309 | Roblin et al. | Aug. 18, 1942 |
| 2,341,016 | Brubaker | Feb. 8, 1944 |
| 2,462,337 | Schechter | Feb. 22, 1949 |
| 2,478,990 | Walker | Aug. 16, 1949 |
| 2,523,710 | Moe et al. | Sept. 26, 1950 |

OTHER REFERENCES

Adams et al.: "Organic Reactions," vol. I, pp. 217, 236–40 (1942).

Stanek et al.: Chem. Abstracts, vol. 46, col. 7100 (1952).